US008148990B2

(12) United States Patent
Helwig et al.

(10) Patent No.: US 8,148,990 B2
(45) Date of Patent: Apr. 3, 2012

(54) MARINE ELECTROMAGNETIC ACQUISITION APPARATUS WITH FOLDABLE SENSOR ARM ASSEMBLY

(75) Inventors: Stefan L. Helwig, Houston, TX (US); Kurt M. Martin, Houston, TX (US)

(73) Assignee: KJT Enterprises, Inc., Houston, TX (US)

( * ) Notice: Subject to any disclaimer, the term of this patent is extended or adjusted under 35 U.S.C. 154(b) by 384 days.

(21) Appl. No.: 12/550,221

(22) Filed: Aug. 28, 2009

(65) Prior Publication Data

US 2009/0315539 A1 Dec. 24, 2009

Related U.S. Application Data

(63) Continuation-in-part of application No. 11/742,352, filed on Apr. 30, 2007, now Pat. No. 7,746,077.

(51) Int. Cl.
*G01V 3/00* (2006.01)

(52) U.S. Cl. ........................................ 324/350

(58) Field of Classification Search .................. None
See application file for complete search history.

(56) References Cited

U.S. PATENT DOCUMENTS

| 5,870,690 | A | 2/1999 | Frenkel |
| 6,842,006 | B2 | 1/2005 | Conti et al. |
| 6,950,747 | B2 | 9/2005 | Byerly |
| 7,443,154 | B1 | 10/2008 | Merewether et al. |
| 7,746,077 | B2 * | 6/2010 | Strack et al. .................. 324/365 |
| 2004/0000912 | A1 | 1/2004 | Conti et al. |
| 2008/0238429 | A1 | 10/2008 | Safinya et al. |
| 2008/0265895 | A1 * | 10/2008 | Strack et al. .................. 324/347 |
| 2008/0265896 | A1 | 10/2008 | Strack et al. |
| 2009/0224765 | A1 | 9/2009 | Tulupov et al. |
| 2009/0315539 | A1 | 12/2009 | Helwig et al. |
| 2010/0148783 | A1 * | 6/2010 | Strack et al. .................. 324/334 |
| 2010/0271032 | A1 * | 10/2010 | Helwig .......................... 324/365 |

FOREIGN PATENT DOCUMENTS

WO 2007141548 A2 12/2007

OTHER PUBLICATIONS

Notification of transmittal of the international search report and the written opinion of the in-ternational searching authority, or the declaration, from International application No. PCT/US2010/043304, Nov. 17, 2010.

Sinha, M.C. Patel, P.D., Unsworth, M.J., Owen, T.R.E., and MacCormack, M.G.R., 1990, An active source electromagnetic sounding system for marine use, Marine Geophysical Research, 12, 29-68.

(Continued)

*Primary Examiner* — Jermele M Hollington
(74) *Attorney, Agent, or Firm* — Richard A. Fagin; Adenike Adebiyi

(57) ABSTRACT

A marine electromagnetic acquisition apparatus includes a sensor module having at least one sensor associated therewith. A sensor arm assembly is coupled to the sensor module. The sensor arm assembly has at least one sensor arm and at least one sensor disposed along the at least one sensor arm. An actuator is coupled to the sensor arm assembly for moving the sensor arm assembly between a folded position and an unfolded position.

15 Claims, 10 Drawing Sheets

OTHER PUBLICATIONS

Edwards, R.N., Law, L.K., Wolfgram, P.A., Nobes, D.C., Bone, M.N., Trigg, D.F., and DeLaurier, J.M., 1985, First results of the MOSES experiment: Sea sediment conductivity and thickness determination, Bute Inlet, British Columbia, by magnetometric offshore electrical sounding: Geophysics 50, No. 1, 153-160.

Edwards, R.N., 1997, On the resource evaluation of marine gas hydrate deposits using the sea-floor transient electric dipole-dipole method: Geophysics, 62, No. 1, 63-74.

Chave, A.D., Constable, S.C. and Edwards, R.N., 1991, Electrical exploration methods for the seafloor: Investigation in geophysics No. 3, Electromagnetic methods in applied geophysics, vol. 2, application, part B, 931-966.

Cheesman, S.J., Edwards, R.N., and Chave, A.D., 1986, On the theory of sea-floor conductivity mapping using transient electromagnetic systems: Geophysics, 52, No. 2, 204 217.

Strack, K.-M., 1992, Exploration with deep transient electromagnetics, Elsevier, 373 pp. (reprinted 1999).

Scholl, C. and Edwards, N., 2007, Marine downhole to seafloor dipole-dipole electromagnetic methods and the resolution of resistive targets, Geophysics, 72, WA39.

Sternberg, B. K., Washburne, J. C. and Pellerin, L., 1988, Correction for the static shift in magnetotellurics using transient electromagnetic soundings, Geophysics, vol. 53, Issue 11, pp. 1459-1468.

Torres-Verdin, C, 1991, Continuous profiling of magnetotelluric fields, Ph.D. Thesis, University of California.

Bostick Jr, F.X., 1992, Principles of spatial surface electric field filtering in magnetotellurics: Electromagnetic array profiling(EMAP), Geophysics, vol. 57, Issue 4, pp. 603-622.

* cited by examiner

MARINE ELECTROMAGNETIC ACQUISITION APPARATUS WITH FOLDABLE SENSOR ARM ASSEMBLY

CROSS-REFERENCE TO RELATED APPLICATIONS

This application is a continuation-in-part of U.S. patent application Ser. No. 11/742,352, filed Apr. 30, 2007.

FIELD

The invention relates generally to the field of marine electromagnetic geophysical surveying. More specifically, the invention relates to apparatus for acquiring, recording and transmitting electromagnetic signals produced for surveying Earth's subsurface.

BACKGROUND

Electromagnetic (EM) geophysical surveying techniques are either natural source or controlled source. In natural source electromagnetic surveying, the response of the Earth's subsurface to natural variations in the Earth's magnetic field is measured. In the controlled source electromagnetic surveying, the response of the Earth's subsurface to externally-applied electromagnetic field is measured. Magnetotellurics (MT) is an example of natural source electromagnetic surveying. In MT measurements, natural variations in the Earth's magnetic field induce electric currents in the Earth's subsurface. Orthogonal electric and magnetic field components of the natural electromagnetic field are measured and used to determine specific ratios of electric-to-magnetic field components called tensor impedances. The tensor may be used to gain insight into the spatial distribution of the conductivity of the Earth's subsurface. Marine electromagnetic geophysical surveying typically involves deploying a plurality of multi-component acquisition apparatus on a water bottom. Each multi-component acquisition apparatus may include one or more sensors for receiving electromagnetic signals produced during surveying of the subsurface below the water bottom and electronics for recording the electromagnetic signals received at the sensor(s).

Controlled source electromagnetic surveying known in the art includes imparting alternating electric current into formations below the sea floor. In frequency controlled source electromagnetic (f-CSEM) surveying, the alternating current has one or more selected frequencies. F-CSEM surveying techniques are described, for example, in Sinha, M. C. Patel, P. D., Unsworth, M. J., Owen, T. R. E., and MacCormack, M. G. R., 1990, *An active source electromagnetic sounding system for marine use*, Marine Geophysical Research, 12, 29-68. Other publications which describe the physics of and the interpretation of electromagnetic subsurface surveying include: Edwards, R. N., Law, L. K., Wolfgram, P. A., Nobes, D. C., Bone, M. N., Trigg, D. F., and DeLaurier, J. M., 1985, *First results of the MOSES experiment: Sea sediment conductivity and thickness determination, Bute Inlet, British Columbia, by magnetometric offshore electrical sounding*: Geophysics 50, No. 1, 153-160; Edwards, R. N., 1997, *On the resource evaluation of marine gas hydrate deposits using the sea-floor transient electric dipole-dipole method*: Geophysics, 62, No. 1, 63-74; Chave, A. D., Constable, S. C. and Edwards, R. N., 1991, *Electrical exploration methods for the Seafloor*: Investigation in geophysics No 3, Electromagnetic methods in applied geophysics, vol. 2, application, part B, 931-966; and Cheesman, S. J., Edwards, R. N., and Chave, A. D., 1987, *On the theory of sea-floor conductivity mapping using transient electromagnetic systems*: Geophysics, 52, No. 2, 204-217.

A typical f-CSEM marine survey can be described as follows. A recording vessel includes cables which connect to electrodes disposed near the sea floor. An electric power source on the vessel charges the electrodes such that a selected magnitude of alternating current, of selected frequency or frequencies, flows through the sea floor and into the Earth formations below the sea floor. At a selected distance ("offset") from the source electrodes, receiver electrodes are disposed on the sea floor and are coupled to a voltage measuring circuit, which may be disposed on the vessel or a different vessel. The voltages imparted into the receiver electrodes are then analyzed to infer the structure and electrical properties of the Earth formations in the subsurface.

Another technique for electromagnetic surveying of subsurface Earth formations known in the art is transient controlled source electromagnetic surveying (t-CSEM). In t-CSEM, electric current is imparted into the Earth at the Earth's surface (or sea floor), in a manner similar to f-CSEM. The electric current may be direct current. At a selected time, the electric current is switched off, switched on, or has its polarity changed, and induced voltages and/or magnetic fields are measured, typically with respect to time over a selected time interval, at the Earth's surface or water surface. Alternative switching strategies are possible; as will be explained in more detail below. Structure of the subsurface is inferred by the time distribution of the induced voltages and/or magnetic fields. T-CSEM techniques are described, for example, in Strack, K.-M., 1992, *Exploration with deep transient electromagnetics*, Elsevier, 373 pp. (reprinted 1999).

U.S. Pat. No. 6,842,006 B1 issued to Conti et al. discloses a subsea electromagnetic measurement system for obtaining MT measurements of the Earth's subsurface. The system includes a central structure to which an electrode may be attached. Arms are pivotally attached to the central structure via hinges. The hinges may include a single-pin connection. The hinges may also include a wide attachment that permits vertical pivotal motion and distributes torsion over a wide area. An electrode and at least two magnetometers are coupled to each arm. The magnetometers form an orthogonal magnetic field measurement system. The arms are adapted to pivot about the hinges so that the electrodes and magnetometers rest on the seafloor when the electromagnetic system is emplaced in a selected position.

SUMMARY

According to a first aspect of the present invention, a marine electromagnetic acquisition apparatus comprises: a sensor module having at least one sensor associated therewith; a sensor arm assembly comprising at least one sensor arm, the sensor arm assembly having at least one sensor disposed along the at least one sensor arm; and an actuator coupled to the sensor arm assembly for moving the sensor arm assembly between a folded position and an unfolded position.

In certain embodiments of the first aspect of the present invention, the at least one sensor arm is substantially parallel to the sensor module when the sensor arm assembly is in the folded position.

In certain embodiments of the first aspect of the present invention, the actuator is activated by pressure.

In certain embodiments of the first aspect of the present invention, the actuator is activated by an external control signal.

In certain embodiments of the first aspect of the present invention, the actuator comprises a piston movably disposed within a cylinder.

In certain embodiments of the first aspect of the present invention, the actuator further comprises a linear-to-rotary mechanism coupling the at least one sensor arm to the piston and configured to rotate the at least one sensor arm relative to the sensor module in response to pressure differential across the piston.

In certain embodiments of the first aspect of the present invention, the sensor module comprises a plurality of sensors, each of which comprises at least one of an electrode, a magnetic field sensor, a seismic sensor, a gravity sensor, and accelerometer, and a geophone.

In certain embodiments of the first aspect of the present invention, the at least one sensor associated with the sensor module comprises an electrode or a magnetic field sensor and the at least one sensor disposed along the at least one sensor arm comprises an electrode or a magnetic field sensor.

In certain embodiments of the first aspect of the present invention, the sensor module further comprises electrical circuitry for digitizing and communicating signals detected by the at least one sensor in the sensor module and the at least one sensor disposed along the at least one sensor arm.

In certain embodiments of the first aspect of the present invention, the sensor arm assembly comprises a plurality of arms and at least one sensor disposed along each of the plurality of arms.

In certain embodiments of the first aspect of the present invention, the plurality of arms are substantially parallel to a side of the sensor module when the sensor arm assembly is in the folded position.

In certain embodiments of the first aspect of the present invention, the plurality of arms form a tetrahedral shape when the sensor arm assembly is in the unfolded position.

In certain embodiments of the first aspect of the present invention, the apparatus further comprises a cable, a plurality of the sensor module disposed at spaced-apart locations along the cable, and a plurality of the sensor arm assembly coupled to the sensor modules.

In certain embodiments of the first aspect of the present invention, the at least one sensor associated with each of the sensor modules comprises a pair of electrodes for measuring electric field in a direction along the cable.

In certain embodiments of the first aspect of the present invention, each of the sensor modules further comprises a plurality of spaced-apart magnetic field sensors.

In certain embodiments of the first aspect of the present invention, the at least one sensor associated with each of the sensor modules comprises an electrode or a magnetic field sensor and the at least one sensor disposed along each of the arms comprises an electrode or a magnetic field sensor.

In certain embodiments of the first aspect of the present invention, each of the sensor modules comprises a plurality of sensors, each of which comprises at least one of an electrode, a magnetic field sensor, a seismic sensor, a gravity sensor, an accelerometer, and a geophone.

Other aspects and advantages of the invention will be apparent from the following description and the appended claims.

DETAILED DESCRIPTION

Figure 1:
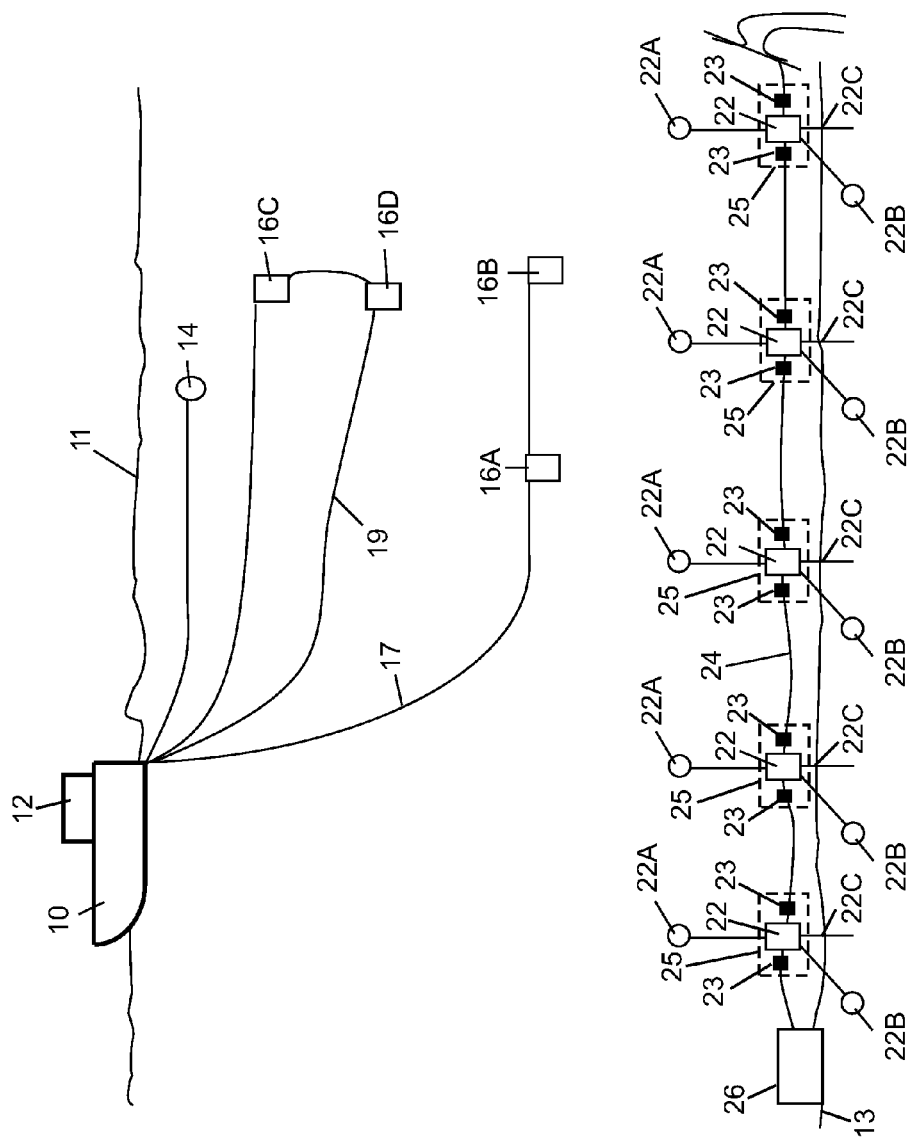
FIG. 1 shows a marine electromagnetic acquisition system that may include acquisition modules according to various aspects of the invention.

The present invention will now be described in detail, with reference to the accompanying drawings. In this detailed description, numerous specific details may be set forth in order to provide a thorough understanding of the invention. However, it will be apparent to one skilled in the art when the invention may be practiced without some or all of these specific details. In other instances, well-known features and/or process steps may not be described in detail so as not to unnecessarily obscure the invention. In addition, like or identical reference numerals may be used to identify common or similar elements.

FIG. 1 shows a marine electromagnetic (EM) survey system including a survey vessel 10 that moves along the surface of a body of water 11 such as a lake or the ocean. The survey vessel 10 includes thereon certain equipment, shown generally at 12 and referred to for convenience as a "recording system." The recording system 12 may include (none of the following shown separately for clarity of the illustration) navigation devices, source actuation and control equipment, and devices for recording and processing measurements made by various sensors in the acquisition system. The vessel 10 may tow a seismic energy source 14 such as an air gun or an array of such air guns, a vertical electric dipole "source" antenna 19 including vertically spaced apart electrodes 16C, 16D and a horizontal electric dipole "source" antenna 17, which may include horizontally spaced apart electrodes 16A, 16B. The vertical electrodes 16C, 16D are typically energized by current flowing through one of the lines going from either electrode 16C or 16D to the survey vessel 10. The other line may be electrically inactive and only used to keep the vertical dipole antenna in its preferred shape. The electrodes on the source antennas 17, 19 may be referred to as "source electrodes" for convenience. The recording system 12 may include a controllable power supply (not shown separately) to energize the source electrodes for the purpose of inducing electromagnetic fields in the subsurface below the water bottom 13.

In the present example the source electrodes 16A, 16B and 16C, 16D, respectively on each antenna 17, 19, can be spaced apart about 50 meters, and can be energized by the power supply (not shown) such that about 1000 Amperes of current flows through the electrodes. This is an equivalent source moment to that generated in typical electromagnetic survey practice known in the art using a 100 meter long transmitter dipole, and using 500 Amperes current. In either case the source moment can be about $5 \times 10^4$ Ampere-meters. The source moment used in any particular implementation is not intended to limit the scope of this invention. The recording system 12 may include equipment (the source controller) that may actuate the seismic source 14 at selected times and may include devices that record or accept recordings for processing from seismic sensors that may be disposed in an electromagnetic (EM) sensor cable 24 or elsewhere in the system.

The EM sensor cable 24 is disposed on or near the water bottom 13 for making measurements corresponding to Earth formations below the water bottom 13. The EM sensor cable 24 may be used with natural source or controlled source EM surveys. The EM sensor cable 24 may include thereon a plurality of longitudinally spaced apart remote acquisition units (RAUs) 25. Each RAU 25 may include a sensor module 22. Each sensor module 22 may have inserted into an upper side thereof a substantially vertically extending sensor arm 22A. Preferably the vertically extending sensor arm 22A includes therein or thereon some type of buoyancy device or structure (not shown separately) to assist in keeping the sensor arm 22A in a substantially vertical orientation with respect to gravity. Each sensor module 22 may include extending from its lower side a spike 22C as described, for example, in Scholl, C. and Edwards, N., 2007, *Marine downhole to seafloor dipole-dipole electromagnetic methods and the resolution of resistive targets*, Geophysics, 72, WA39, for penetrating the sediments that exist on the water bottom 13 to a selected depth therein. In the present example, laterally extending sensing arms 22B may be disposed from one or both sides of each sensor module 22. Measurement electrodes 23, e.g., galvanic electrodes, may be disposed adjacent to the longitudinal ends of each sensor module 22. The measurement electrodes 23 may be used to measure voltages related to certain components of electric field response to induced electromagnetic fields in the Earth's subsurface.

Signals acquired by various sensing devices associated with each sensor module 22 and the EM sensor cable 24 may be transmitted to and stored in a recording node 26. Such transmission may be made by including in the EM sensor cable 24 one or more electrical and/or optical conductors (not shown) to carry electrical power and/or data signals. The recording node 26 may be disposed on the water bottom 13 as shown or disposed in a buoy (not shown) at the discretion of the system designer. The recording node 26 may include any form of data storage device, for example a terabyte-sized hard drive or solid state memory. If disposed on the water bottom 13 as shown in FIG. 1, the recording node 26 may be retrieved from the water bottom 13 by the vessel 10 to interrogate the storage device (not shown), or the storage device (not shown) may be accessed for interrogation by connecting a data transfer cable (not shown) to a suitable connector or port (not shown) on the recording node 26. The manner of data storage and transfer with respect to the node 26 may be according to well known art and are not intended to limit the scope of this invention.

Figure 2:
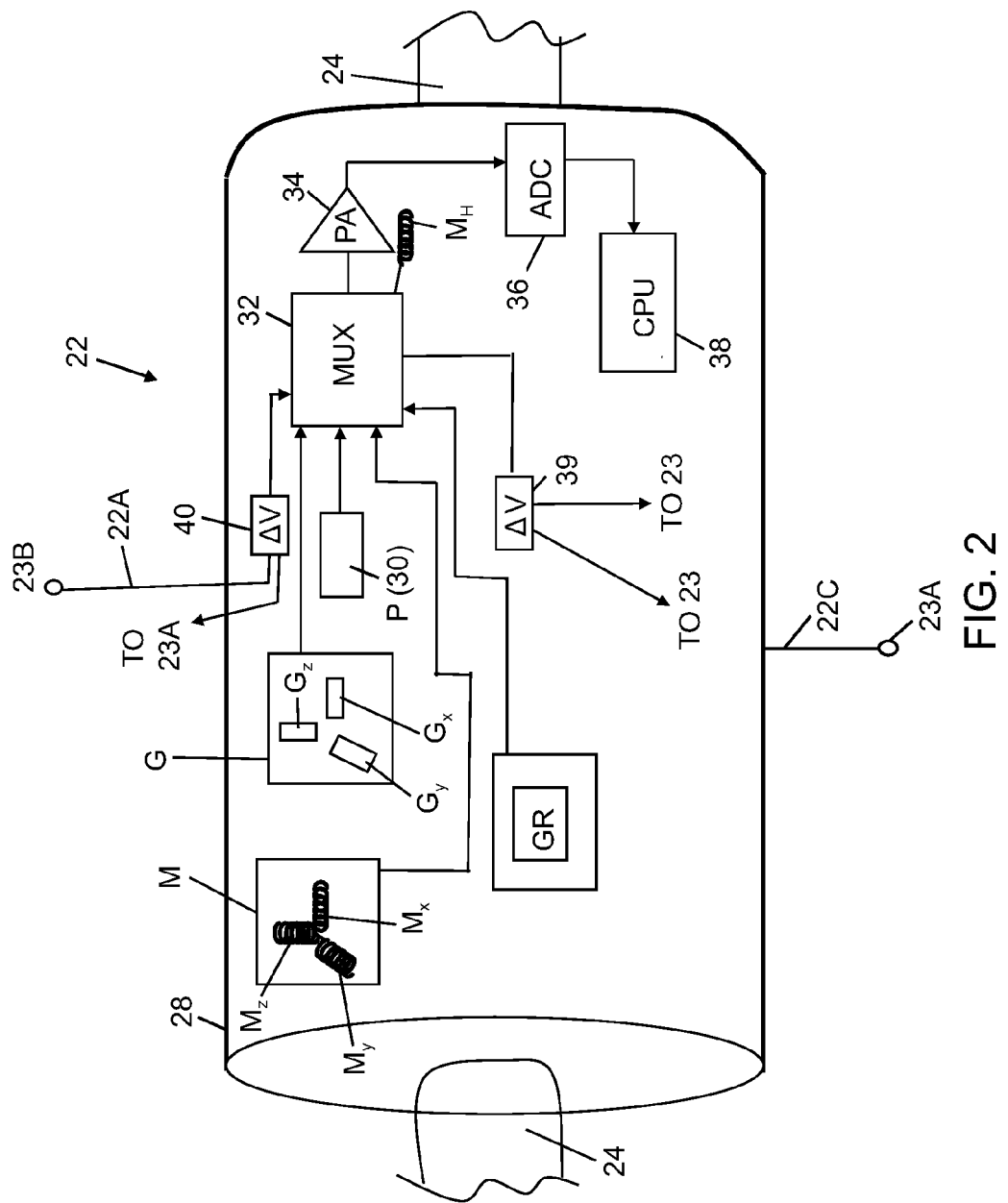
FIG. 2 shows one example of an acquisition module that may be used with the system shown in FIG. 1.

FIG. 2 is a cut-away view of one example of the sensor module 22 included in a RAU (25 in FIG. 1). The sensor module 22 may include a sealed, pressure resistant housing 28 affixed to the EM sensor cable 24 at a selected position along the EM sensor cable 24. The housing 28 may be affixed to the cable 24 by splicing within the cable, by molding the housing 28 thereon or by using water tight, pressure resistant electrical and mechanical connectors on each of the cable 24 and housing 28, such as a connector shown in U.S. Pat. No. 7,113,448 issued to Scott. The interior of the housing 28 may define a pressure sealed compartment that may include some or all of the components described below. Sensing elements in the module 22 may include a three-axis magnetometer M that includes horizontal Mx, My and vertical Mz component magnetic field sensors. A three component seismic particle motion sensor G may also be disposed in the housing 28. The seismic particle motion sensor G may include three mutually orthogonal motion sensors Gx, Gy, Gz such as geophones or accelerometers. The seismic sensor G detects particle motion components of a seismic wavefield induced by the seismic source (14 in FIG. 1). The sensor module 22 may also include a hydrophone 30 in pressure communication with the water (11 in FIG. 1) for detecting the pressure component of the seismic wavefield induced by the seismic source (14 in FIG. 1). The sensor module 22 may also include a gravity sensor GR within the housing 28. The sensor module 22 may include voltage measuring circuits 39, 40 to measure voltages impressed across pairs of measurement electrodes (23 in FIG. 1) disposed on opposed sides of the sensor module 22 along the cable 24. In the present example, the electrode pairs may also include an electrode disposed along or at the end of each of the vertical sensing arm 22A (the electrode shown at 23B) and the spike 22C (the electrode shown at 23A). The vertical sensing arm 22A may be coupled to the housing 28.

Signals generated by each of the sensing devices described above may enter a multiplexer 32. Output of the multiplexer 32 may be conducted through a preamplifier 34. The preamplifier may be coupled to the input of an analog to digital converter (ADC) 36, which converts the analog voltages from the preamplifier 34 into digital words for storing and processing by a central processor 38, which may be any microprocessor based controller and associated data buffering and/or storage device known in the art. Data represented by digital words may be formatted for signal telemetry along the cable 24 to the recording node (26 in FIG. 1) for later retrieval and processing, such as by or in the recording system (12 in FIG. 1). The sensor module 22 may also include one or more high frequency magnetometers MH in signal communication with the multiplexer 32 and the components coupled to the output thereof.

Figure 3:
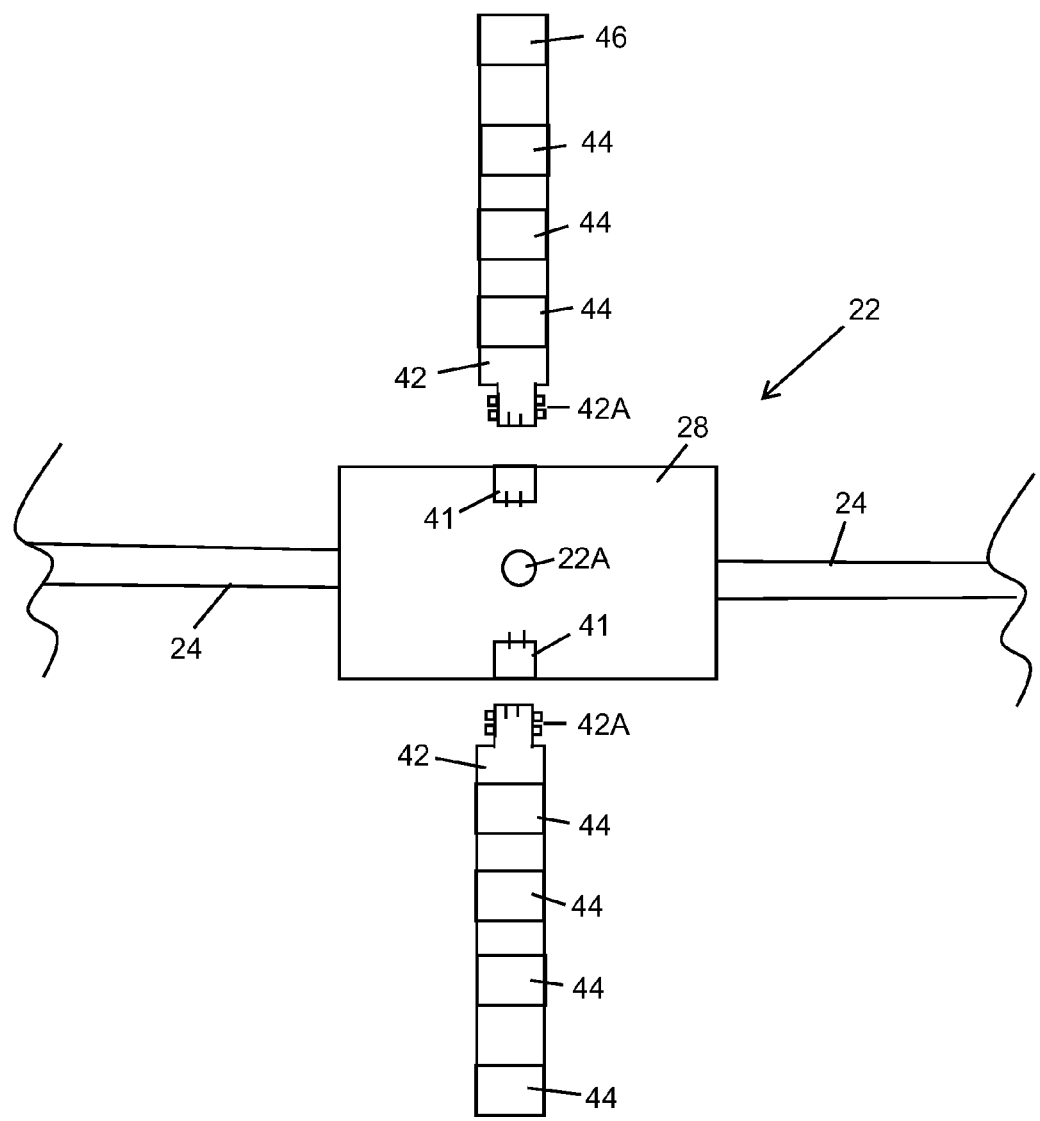
FIG. 3 shows another example of an acquisition module.

The example sensor module 22 of FIG. 2 is shown in plan view in FIG. 3. The horizontal sensing arms 42 (also shown as 22B in FIG. 1) may be coupled to the housing 28 using pressure-sealed electrical connectors 42A that mate with corresponding connectors 41 in the housing 28. The sensing arms 42 may alternatively be permanently attached to the sensor module 22 and foldable as well. The connectors 42A, 41 include one or more insulated electrical contacts to communicate power and/or signals to various sensing elements in the horizontal sensor arms 42. The sensing elements may include a plurality of spaced apart single or multi-axis magnetic field sensors 44, and a galvanic electrode 46. The vertical sensing arm 22A may be similarly configured to have an electrode and multiple magnetic field sensors. The spike (22C in FIG. 2) may be similarly instrumented with such sensing devices. The various sensor arms and the spike may be configured such that they may be quickly installed and locked into the housing, as shown, as the cable 24 is extended into the water (11 in FIG. 1) from the survey vessel (10 in FIG. 1).

Configured as explained with reference to FIGS. 2 and 3, the sensor module 22 includes sensing devices to measure electric field in three dimensions and sensing devices to measure magnetic field in three dimensions. The time derivative of the magnetic field can be derived from the measured magnetic field by numerical methods. By using the time derivative of the magnetic field, which is perpendicular to the area enclosed by the cable, and the electric field measurements along the cable, it is possible to determine components of electric field in any direction connecting two sensor modules 22, especially in a direction transverse to the cable 24. The induction law states that the integrated change of magnetic flux through an area is equal to integrated electric field along the border of the area, as shown in equation (1) below:

$$\oint_{\partial A} \vec{E} d\vec{l} = -\frac{d}{dt} \int_A \vec{B}_Z \cdot d\vec{A} \quad (1)$$

Because of equation (1), it is possible to determine the area integral over the change of the magnetic flux through this area. Backwards, if the area integral over the change of the magnetic flux through the area is known, it will be possible to determine the electric field along any missing part of the border of the area, as long as it is only one missing part of the closed pattern and the electric field along the other part is known.

In addition the magnetic field gradient may be measured along the direction of the cable 24 (the third direction) by measuring difference between magnetic field measurements made in adjacent modules 22, or between successively more spaced apart modules 22 along the cable 24. By measuring spatial components of magnetic field gradient, it may be possible to determine components of electric field in a direction transverse to the magnetic field gradient measurements. Ampere's law states that the spatial gradient of the magnetic field is equivalent to the derivative in time of the dielectric displacement field plus the free current density, as shown in equation (2) below:

$$\nabla \times \vec{H} = \vec{J} + \frac{\partial \vec{D}}{\partial t} \quad (2)$$

The current density is linearly related to the electric field via the conductivity of the medium and the dielectric displacement field is linearly related to the electric field via the permittivity ∈. Thus, equation (2) can be reformulated as:

$$\nabla \times \vec{H} = \sigma \vec{E} + \varepsilon \frac{\partial \vec{E}}{\partial t} \quad (3)$$

As for the case of sea water the permittivity is 11 orders of magnitude smaller than the conductivity so the second term on the left can be neglected. Thus, by measuring magnetic field gradient along selected directions using a cable system as shown herein, it is possible to determine a transverse component of the electric field.

Figure 4A:
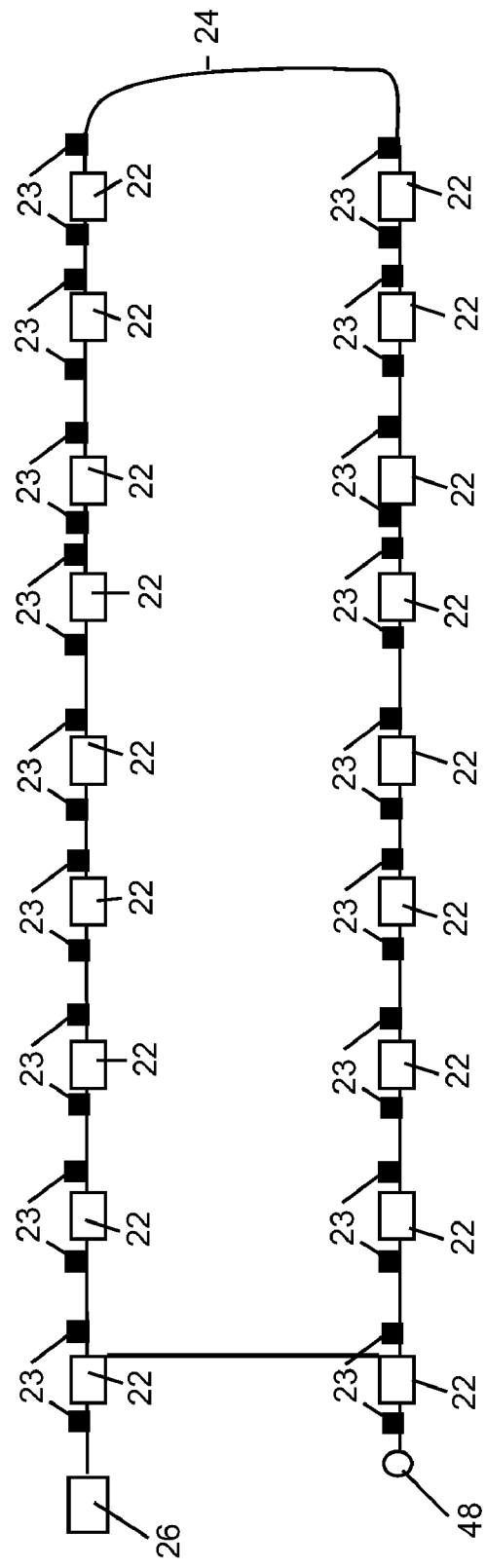
FIGS. 4A-4C show different examples of deployment of a sensor cable
Figure 4B:
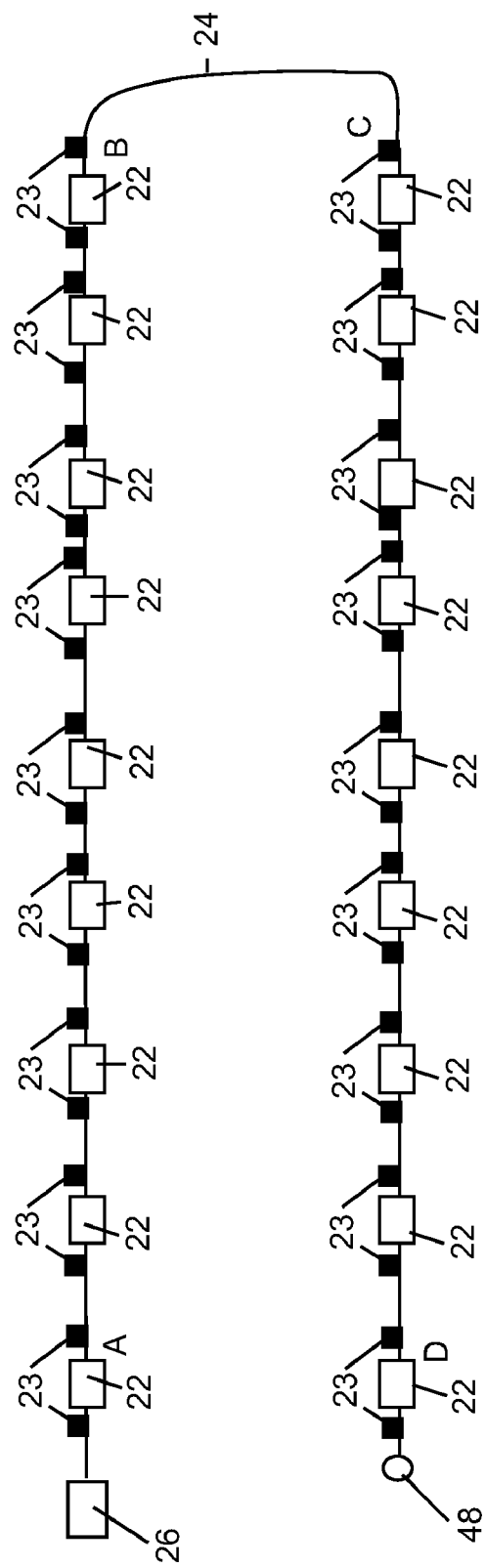

FIGS. 4A and 4B show examples of deployment of a cable system that measures electric field response and magnetic field response in three directions along a nonlinear pattern. From the measurements made by the cable system, an electric field response in a direction normal to the measured electric field response can be determined using the electric field response and the magnetic field response measurements. The cable 24 may include a tail buoy 48 at its distal end from the recording node 26. The cable 24 may be disposed on the water bottom or on the Earth's surface in a closed pattern, as shown in FIG. 4A, or in an open pattern, as shown in FIG. 4B. The horizontal sensing arms 42 for determining transverse components of the electric field may be omitted from the system of FIGS. 4A and 4B. When the electrodes 23 are disposed in a closed or open pattern, transverse components of electric field between laterally-opposed electrodes (positions along the pattern) may be inferred from (i) the electric field measurements made between the longitudinally-spaced electrodes 23 at such opposed positions and along the pattern that connects the opposed positions and (ii) the time derivative of the magnetic field measurements at these positions. As previously noted, the time derivative of the magnetic field measurements can be obtained by numerical methods from the magnetic field response measurements made in three directions along the cable 24.

Figure 4C:
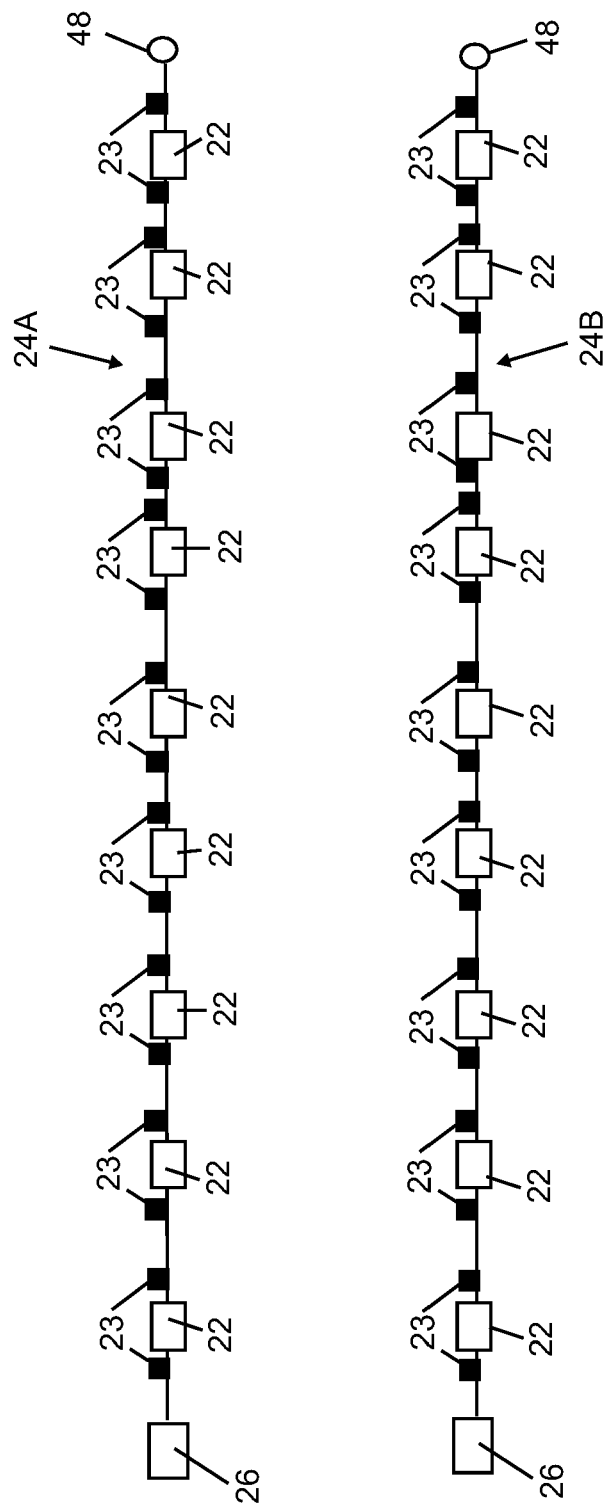

If components of the electric field transverse to the direction of the cable 24 are determined by measuring magnetic field gradient, by using transversely mounted sensing arms or making an additional electric field measurement (e.g., at position C and B), then it may be possible to conduct a survey without having the cable in a "loop" configuration as shown in FIG. 4A (closed loop) and FIG. 4B (open loop). Note that in FIGS. 4A and 4B, the "loop" provides laterally-opposing cable sections. FIG. 4C shows a "non-loop" cable pattern including two laterally-opposed cables 24A, 24B that are unconnected at their opposing distal ends (i.e., unconnected at opposing positions A, D and opposing positions C, B). Each of the sensor cables 24A, 24B may be connected to a recording node 26 and buoy 48 as explained above for sensor cable 24 in FIGS. 4A and 4B. In general, the non-loop cable pattern may include two or more laterally-opposed cables arranged as shown in FIG. 4C. Measurement of electric field response along each of the cables 24A, 24B and additional electric field measurement, e.g., at the electrodes at the ends of the cables 24A, 24B (e.g., at positions C, B), can be used to determine the electric field between any two opposed positions along the cables 24A, 24B.

Figure 5:
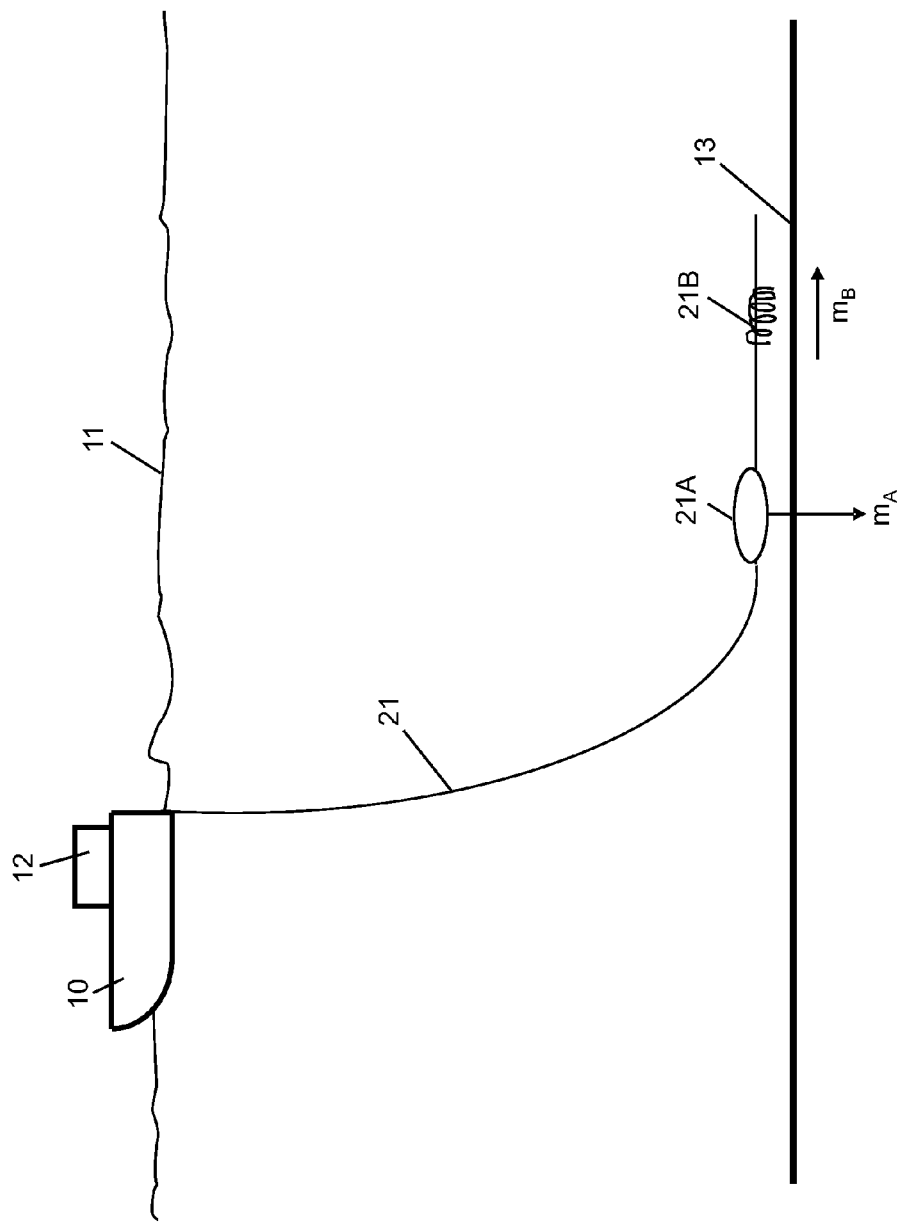
FIG. 5 shows inducing magnetic fields in the Earth's subsurface.

The system shown in FIG. 1 includes horizontal and/or vertical electric dipole antennas for inducing an electric field in the Earth's subsurface, wherein electric and magnetic responses of the Earth are measured. It should be understood that the invention is equally applicable where magnetic fields are induced. Referring to FIG. 5, the survey vessel 10 may tow loop antennas 21A, 21B at the end of a cable 21. The recording system 12 may pass electrical current through horizontal loop antenna 21A to induce a vertical magnetic field $m_A$ in the subsurface, and through vertical loop antenna 21B to induce a horizontal magnetic field $m_B$ in the subsurface. Measurements made by the various sensing devices in the system (see FIGS. 2 through 4C) may be made in response to such magnetic fields. Magnetic fields may be induced in addition to as well as an alternative to electric fields for any particular electromagnetic survey.

It will also be apparent to those skilled in the art that the sensor cable (24 in FIG. 1) can also be arranged in a line, particularly where the horizontal sensing arms 42 are used, and/or where spaced apart magnetic field sensors are used to determine transverse components of electric field from the magnetic field gradient.

The sensor cable 24 may also be used with magnetotelluric (MT) measurement methods and is not limited to controlled source electromagnetic measurement methods. In one example of a method according to the invention, a plurality of transient controlled source electromagnetic measurements (t-CSEM), including one or more of electric field and magnetic field are made along one or more selected directions using a cable as shown in FIG. 4A. Preferably, such measurements of electric and magnetic field are made along three orthogonal directions. For such plurality of measurements, preferably the source antenna (FIG. 1) is in a substantially fixed position. The electric and magnetic field measurements are summed or stacked. The result of the stacking is a high quality t-CSEM signal response. The stacked t-CESM signal response may then be subtracted from the signals recorded over a substantial period of time. The result will be the magnetotelluric (MT) response measured by all the various sensing elements on the cable. The MT response may be processed according to techniques known in the art. See, for example, U.S. Pat. No. 6,950,747 issued to Byerly.

When MT response is determined as explained above, and processed according to one or more techniques known in the art, it then becomes possible to perform a joint inversion of the t-CSEM and MT responses. If frequency domain electromagnetic response is measured, such response may also be jointly inverted. Joint inversion is described, for example, in U.S. Pat. No. 5,870,690 issued to Frenkel et al. A particular benefit that may be provided by making both CSEM and MT measurements from the same sets of sensing devices, and processed through the same electronic circuitry, for the purposes of join inversion is that the degree of scaling or other response matching that would be required if the MT and CSEM responses were measured using separate systems, is substantially reduced.

Using a sensor cable as shown herein, it is also possible to perform electric field mapping in order to correct the MT response measurements for static shifts. See, for example, Sternberg, B. K., Washburne, J. C. and Pellerin, L., 1988, Correction for the static shift in magnetotellurics using transient electromagnetic soundings, Geophysics, Volume 53, Issue 11, pp. 1459-1468. Prior to having a cable as explained herein, the technique disclosed in the foregoing publication was only applicable for land-based surveys. Using a cable and method according to the invention, however, it is possible to correct the MT response for statics using the t-CSEM response measured by the same sensing elements in the sensor cable disposed on the sea floor. See also, Torres-Verdin, C, 1991, Continuous profiling of magnetotelluric fields, Ph.D. Thesis, University of California, and Torres-Verdin, C. and Bostick Jr, F. X., 1992, Principles of spatial surface electric field filtering in magnetotellurics: Electromagnetic array profiling (EMAP), Geophysics, Volume 57, Issue 4, pp. 603-622. As explained in one or more of the foregoing publications, the MT response may be subject to vertical shifting in the log domain. Such shifting is caused by relatively conductive or resistive "patches" of formation close to the water bottom. The t-CSEM response is substantially unaffected by such patches, however, and may be used to calibrate the MT response for the effects of such patches.

Figure 6:
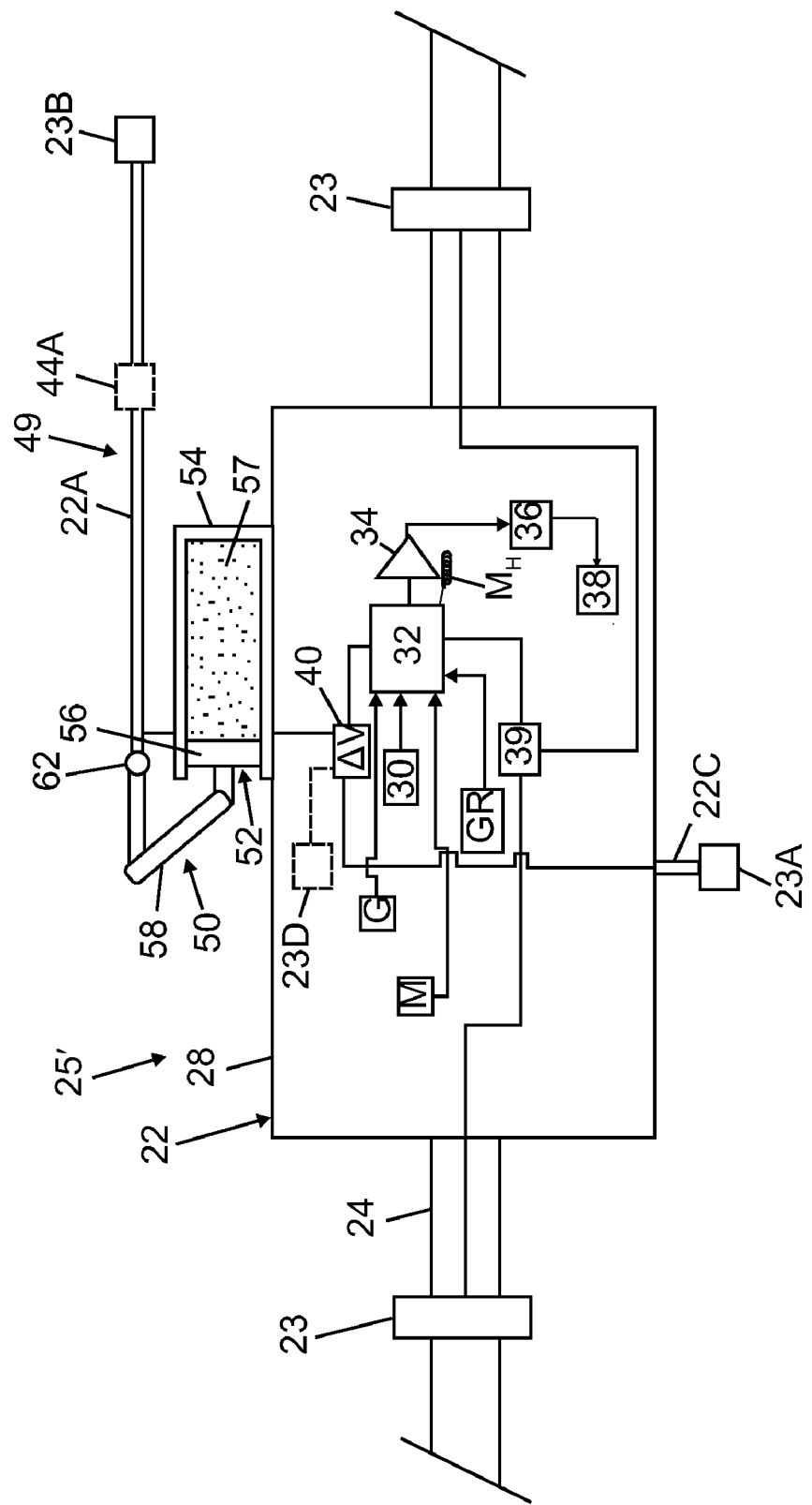
FIG. 6 is a diagram of a remote acquisition unit including a sensor arm in a folded position coupled to a sensor module.
Figure 7:
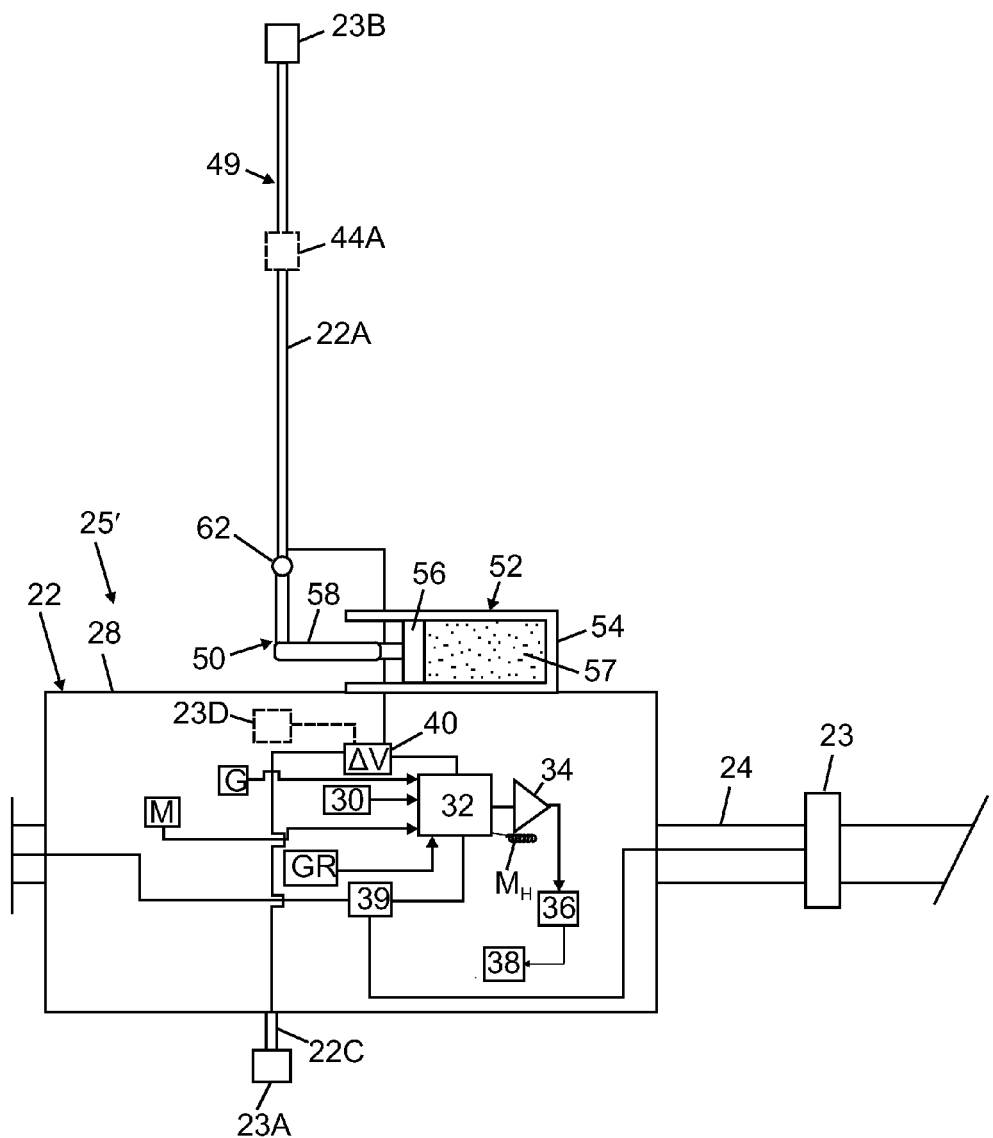
FIG. 7 is a diagram of a remote acquisition unit including a sensor arm in an unfolded position coupled to a sensor module.

FIG. 6 shows a remote acquisition unit (RAU) 25'. The primary difference between RAU 25' and RAU 25 in FIG. 1 is that a sensor arm assembly 49 including the sensor arm 22A and an electrode 23B disposed along the sensor arm 22A is coupled to the sensor module 22 by an actuator 50. The term "sensor arm" is used to refer to an arm that bears at least one sensor. The actuator 50 is configured to selectively fold and unfold the sensor arm 22A. In the folded position, the sensor arm 22A is parallel to one side of the housing 28 of the sensor module 22. In this folded position of the sensor arm 22A, it is possible to put the sensor cable 24 on a winch for storage purposes. In the unfolded position, the sensor arm 22A is positioned at a desired orientation for making a measurement using the electrode 23B or other electrode on the sensor arm 22A. In one example, as shown in FIG. 7, the sensor arm 22A may be substantially perpendicular to the housing 28 of the sensor module 22 in order to allow the electrode 23B to be used in making a cross-line measurement. Operation of the actuator 50 will be described in more detail below. The electrode 23B disposed along the sensor arm 22A together with the electrode 23A on the spike 22C may be used to make measurements in a direction perpendicular to the RAU 25' (or sensor cable 24), i.e., cross-line measurements, where the sensor arm 22A serves to establish a desired distance between the electrodes 23A, 23B. The spike 22C is typically short enough such that it does not prevent the sensor cable 24 from being put on a winch. Alternatively, the spike 22C may be replaced with a foldable sensor arm similar to sensor arm 22A. A sensor arm similar to sensor arm 22A may be mounted on any of the sides (including top and bottom) of the sensor module 22 (or housing 28 of the sensor module 22) for the purposes of making measurements. The details of the sensor module 22 have been described above, particularly with reference to FIG. 2. In addition to the description above, an electrode 23D may be located within the sensor module 22 and paired with the electrode 23B for making cross-line measurements. In other examples, different types of sensors or multiple sensors may be disposed along the sensor arm 22A. The sensors may, in some examples, be selected from electrodes and magnetic field sensors. For example, FIGS. 6 and 7 show a magnetic field sensor 44A disposed along the sensor arm 22A in addition to the electrode 23B—the magnetic field sensor 44A may be used to make cross-line magnetic field measurements. When multiple sensors are disposed along the sensor arm 22A, the sensors are typically separated by a sufficient distance to allow cross-line measurements to be made while minimizing signal-to-noise ratio. All sensors on the sensor arm 22A may be connected to a cable or wire inside the sensor arm 22A. The cable inside the sensor arm 22A may be connected to the sensor module 22 by use of a connector (not shown).

The actuator 50 can be operated to move the sensor arm 22A from the unfolded position (shown in FIG. 7) to the folded position (shown in FIG. 6). In one example, the actuator 50 is configured to respond to pressure at the exterior of the sensor module 22. The actuator 50 may be configured to move the sensor arm 22A into the folded position (shown in FIG. 6) under first pressure conditions and to move the sensor arm 22A into the unfolded position (shown in FIG. 7) under second pressure conditions. The first pressure conditions may correspond to pressure conditions at the surface (above the water surface 11 in FIG. 1) and within a selected distance from the water surface (11 in FIG. 1), and the second pressure condition may correspond to pressure conditions in the water (11 in FIG. 1) and within a selected distance from the water bottom (13 in FIG. 1). In one example, the pressure-responsive actuator 50 includes a fluid-powered system 52, which may have a cylinder 54 and a piston 56 movably disposed in the cylinder 54. The cylinder 54 may contain a compressible fluid 57, e.g., a gas. At the first pressure conditions, the pressure of the compressible fluid 57 is greater than the pressure at the exterior of the sensor module 22. At the second pressure conditions, the pressure of the compressible fluid 57 is less than the pressure at the exterior of the sensor module 22.

Differential pressure across the piston 56 moves the piston 56 linearly within the cylinder 54. The piston 56 may be coupled to a linear-to-rotary mechanism 58 that will convert the linear displacement of the piston 56 to rotary motion. The linear-to-rotary mechanism 58 is coupled to the sensor arm 22A so that the rotary motion of the linear-to-rotary mechanism 58 results in rotation of the sensor arm 22A relative to the housing 28 of the sensor module 22. Any suitable linear-to-rotary mechanism 58 may be used. The linear-to-rotary mechanism 58 may be, for example, a connecting rod. In one example, one end of the sensor arm 22A is fastened onto an axle 62, and the connecting rod 58 is fastened at one end to the axle 62 and at another end to the piston 56. At the surface (first pressure conditions), the compressible fluid 57 is fully expanded and the sensor arm 22A is parallel to the housing 28 of the sensor module 22 (folded position). During deployment of the sensor module 22 into the water, water pressure linearly displaces the piston 56 (second pressure conditions), compressing the compressible fluid 57. The linear motion of the piston 56 is converted to rotary motion, which results in unfolding of the sensor arm 22A, as shown in FIG. 7. During recovery of the sensor module 22, the sensor arm 22A folds back to the parallel position as soon as the pressure of the compressible fluid 57 exceeds the water pressure (first pressure conditions), as shown in FIG. 6.

The actuator 50 for unfolding and folding the sensor arm 22A is not limited to one that is pressure-activated. Other mechanisms for unfolding and folding the sensor arm may be actively controlled by the electronics inside the sensor module 22. For example, based on a control signal, the sensor arm 22A may be unfolded by an electrical motor (not shown) that rotates a thread or by an active pump (not shown) that opens the sensor arm 22A hydraulically. In the case of the electrical motor, a linear displacement resulting from the rotated thread can be converted to rotary motion of the sensor arm 22A using a suitable linear-to-rotary mechanism, or the rotary motion of the rotated thread can be converted to rotary motion (angular displacement) of the sensor arm 22A using a suitable rotary-to-angular-displacement mechanism. The control signal may be generated by the electronics in the sensor module 22 based upon reaching a certain pressure regime, or the sensor arm 22A and associated actuator may be controlled by signals sent by the central computer in a buoy.

Figure 8:
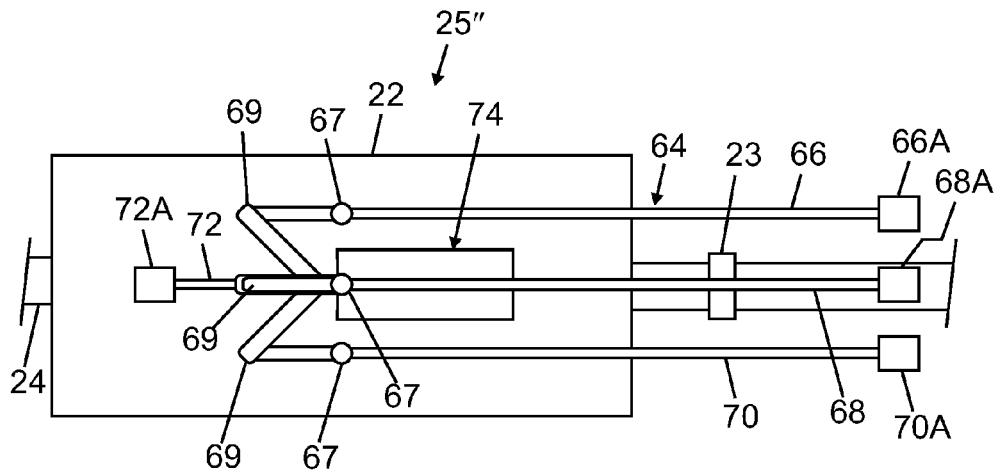
FIG. 8 is a diagram of a remote acquisition unit including a sensor arm assembly with a plurality of sensor arms in a folded position.
Figure 9:
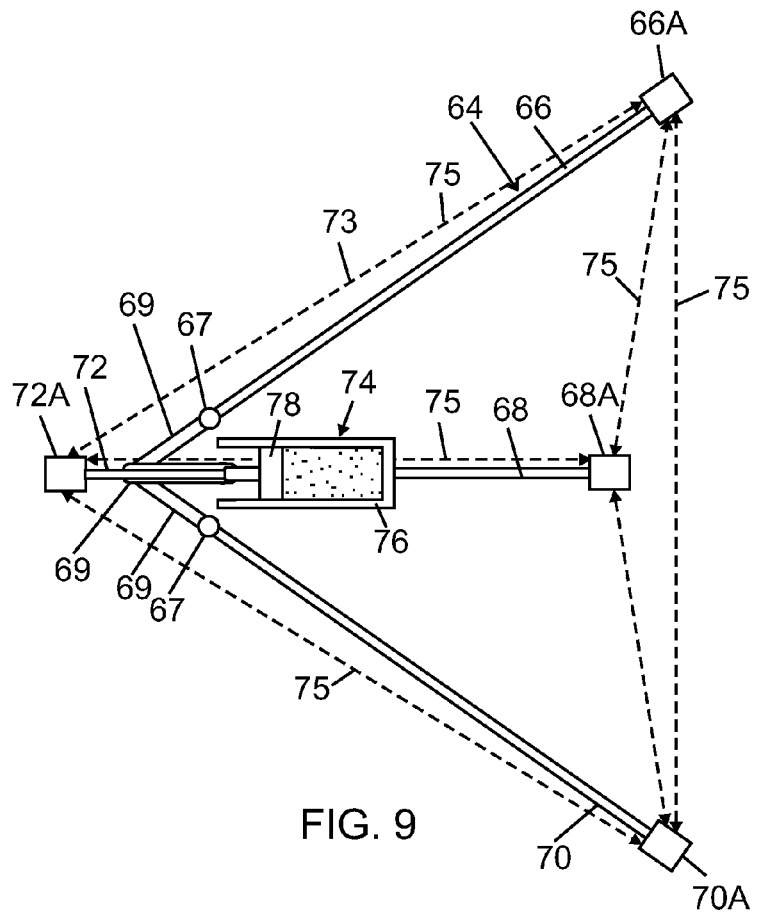
FIG. 9 is a diagram of a sensor arm assembly with a plurality of sensor arms in an unfolded position.

In FIGS. 6 and 7, the sensor arm assembly 49 has a single sensor arm 22A. In alternate embodiments, a sensor arm assembly having multiple sensor arms may be coupled to the sensor module 22. In the example shown in FIG. 8, a RAU 25" includes a sensor arm assembly 64 coupled to the sensor module 22 by an actuator 74. The sensor arm assembly 64 may be coupled to the any of the sides (including top and bottom) of the sensor module 22. The sensor arm assembly 64 includes sensor arms 66, 68, 70, 72 with one or more sensors 66A, 68A, 70A, 72A disposed along the sensor arms 66, 68, 70, 72, respectively. The sensors 66A, 68A, 70A, 72A disposed along the sensor arms 66, 68, 70, 72 may be, for example, electrodes, magnetic field sensors, or other sensors useful in making EM field measurements. All sensors on the sensor arms 66, 68, 70, 72 may be connected to a cable inside each of the sensor arms 66, 68, 70, 72, as described above for sensor arm 22A in FIGS. 6 and 7. In the unfolded position, the sensor arm assembly 64 has a fork arrangement with sensor arms 66, 68, 70, 72 being substantially parallel to each other—the sensor arm 68 may be substantially aligned with sensor arm 72. The actuator 74 can be operated to unfold the sensor arm assembly 64, as shown in FIG. 9, such that the sensor arms 66, 68, 70, 72 form a tetrahedral shape 73 and the sensors 66A, 68A, 70A, 72A are placed on the edges of the tetrahedral shape 73 for the purposes of making measurements. Any combination of the sensors 66A, 68A, 70A, 72A may be used to make measurements, as indicated, for example, by the dashed arrows 75. Any of the sensors 66A, 68A, 70A, 72A may also be paired with other sensors in or otherwise attached to the sensor module (22 in FIG. 8) for making measurements. For simplicity, the sensor module 22 is not shown in FIG. 9, but the folded sensor arm assembly 64 shown in FIG. 8 can be replaced with the unfolded sensor arm assembly 64 to visualize the relationship between the sensor arm assembly 64 and the sensor module 22 when the sensor arm assembly 64 is in the unfolded position.

The actuator 74 may be a pressure-activated actuator. As shown in FIG. 9, the pressure-activated actuator 74 may include a cylinder 76 and piston 78, which may be similar to the cylinder 54 and piston 56 of actuator 50 in FIGS. 6 and 7. Axles 67 may be fastened to one of the ends of the sensor arms 66, 68, and 70. The actuator 74 may include linear-to-rotary mechanisms to transfer linear displacement of the piston 78 to angular displacement of the sensor arms 66, 68, and 70. In one example, connecting rods 69 are used as the linear-to-rotary mechanisms. The connecting rods 69 are connected to the axles 67 and the piston 78. One of the ends of the sensor arm 72, i.e., the end not including the electrode 72A, is also coupled to the piston 78. A linear-to-rotary joint is not needed between the sensor arm 72 and the piston 78. Pressure differential across the piston 78 causes the piston 78 to reciprocate within the cylinder 76. The linear displacement of the piston 78 is translated into rotary motion (or angular displacement) for sensor arms 66, 68, 70 and linear motion (or linear displacement) for the sensor arm 72. The actuator 74 may operate using a pressure scheme similar to the one described above with respect to actuation of the sensor arm 22A in FIGS. 6 and 7. Under first pressure conditions, as described above, the actuator 74 may act to fold the sensor arm assembly 64, as shown in FIG. 8. Under second pressure conditions, as described above, the actuator 74 may act to unfold the sensor arm assembly 64, as shown in FIG. 9. When the sensor arm assembly 64 is in the folded position, the sensor arms 66, 68, 70, 72 are substantially parallel to a side of the sensor module 22, which delivers advantages in terms of storing and preventing damage to the sensor arm assembly 64 while coupled to the sensor module 22.

The actuator 74 for unfolding and folding the sensor arms of the sensor arm assembly 64 need not be limited to one that is pressure-activated. As described above for sensor arm 22A in FIGS. 6 and 7, other mechanisms that respond to control signals from electronics inside the sensor module 22 or a central computer in a buoy (not shown) may be used. Examples of such other mechanisms include, without limitation, an electrical motor or a hydraulic pump.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine electromagnetic acquisition apparatus, comprising:
    a sensor module having at least one sensor associated therewith;
    a sensor arm assembly coupled to the sensor module, the sensor arm assembly having at least one sensor arm and at least one sensor disposed along the at least one sensor arm; and
    an actuator coupled to the sensor arm assembly for moving the sensor arm assembly between a folded position and an unfolded position, wherein the actuator is activated by at least one of an external control signal and pressure.

2. The apparatus of claim 1, wherein the at least one sensor arm is substantially parallel to the sensor module when the sensor arm assembly is in the folded position.

3. The apparatus of claim 1, wherein the actuator comprises a piston movably disposed within a cylinder.

4. The apparatus of claim 3, wherein the actuator further comprises a linear-to-rotary mechanism coupling the at least one sensor arm to the piston and configured to rotate the at least one sensor arm relative to the sensor module in response to pressure differential across the piston.

5. The apparatus of claim 2, wherein the sensor module comprises a plurality of sensors, each of which comprises at least one of an electrode, a magnetic field sensor, a seismic sensor, a gravity sensor, an accelerometer and a geophone.

6. The apparatus of claim 2, wherein the at least one sensor associated with the sensor module comprises an electrode or a magnetic field sensor and the at least one sensor disposed along the at least one sensor arm comprises an electrode or a magnetic field sensor.

7. The apparatus of claim 1, wherein the sensor module further comprises electrical circuitry for digitizing and communicating signals detected by the at least one sensor in the sensor module and the at least one sensor disposed along the at least one sensor arm.

8. The apparatus of claim 1, wherein the sensor arm assembly comprises a plurality of arms and at least one sensor disposed along each of the plurality of arms.

9. The apparatus of claim 8, wherein the plurality of arms are substantially parallel to a side of the sensor module when the sensor arm assembly is in the folded position.

10. The apparatus of claim 9, wherein the plurality of arms form a tetrahedral shape when the sensor arm assembly is in the unfolded position.

11. The apparatus of claim 2, further comprising a cable, a plurality of the sensor module disposed at spaced-apart locations along the cable, and a plurality of the sensor arm assembly coupled to the sensor modules.

12. The apparatus of claim 11, wherein the at least one sensor associated with each of the sensor modules comprises a pair of electrodes for measuring electric field in a direction along the cable.

13. The apparatus of claim 12, wherein each of the sensor modules further comprises a plurality of spaced-apart magnetic field sensors.

14. The apparatus of claim 11, wherein the at least one sensor associated with each of the sensor modules comprises an electrode or a magnetic field sensor and the at least one sensor disposed along each of the arms comprises an electrode or a magnetic field sensor.

15. The apparatus of claim 11, wherein each of the sensor modules comprises a plurality of sensors, each of which comprises at least one of an electrode, a magnetic field sensor, a seismic sensor, a gravity sensor, an accelerometer and a geophone.

* * * * *

UNITED STATES PATENT AND TRADEMARK OFFICE
CERTIFICATE OF CORRECTION

| | |
|---|---|
| PATENT NO. | : 8,148,990 B2 |
| APPLICATION NO. | : 12/550221 |
| DATED | : April 3, 2012 |
| INVENTOR(S) | : Stefan L. Helwig and Kurt M. Strack |

It is certified that error appears in the above-identified patent and that said Letters Patent is hereby corrected as shown below:

Title Page, Item (75) Inventors
Please change the last name of the second inventor from Martin to STRACK.

Signed and Sealed this
Fifteenth Day of May, 2012

David J. Kappos
*Director of the United States Patent and Trademark Office*